INVENTORS.
LOREN G. ARNOLD
ANTHONY S. TRAPKUS

INVENTORS.
LOREN G. ARNOLD
ANTHONY S. TRAPKUS

INVENTORS.
LOREN G. ARNOLD
ANTHONY S. TRAPKUS

United States Patent Office 3,236,313
Patented Feb. 22, 1966

3,236,313
TOWED PLOW
Loren G. Arnold, Rock Island, and Anthony S. Trapkus, Moline, Ill., assignors to Deere & Company, Moline, Ill., a corporation of Delaware
Filed May 28, 1964, Ser. No. 370,995
3 Claims. (Cl. 172—328)

This invention relates generally to agricultural implements and more particularly to multi-bottom plows of considerable size and weight.

The object and general nature of this invention is the provision of new and improved raising and lowering means whereby the front and rear ends of the plow may be raised and lowered independently of one another so as to facilitate making uniform headlands at the ends of the field being plowed.

More specifically, it is a feature of this invention to provide a multi-bottom plow with new and improved front end raising means involving a front furrow wheel and means for raising and lowering the frame of the plow relative thereto, and, interconnected with the front furrow wheel raising and lowering means, new and improved hitch means movably connected with the plow and carried on the propelling tractor for raising and lowering the hitch frame of the plow with respect to the tractor simultaneously with raising and lowering the plow frame relative to the front furrow wheel.

These and other objects and advantages of the present invention will be apparent to those skilled in the art after a consideration of the following detailed description, taken in conjunction with the accompanying drawings, in which.

Figure 1:
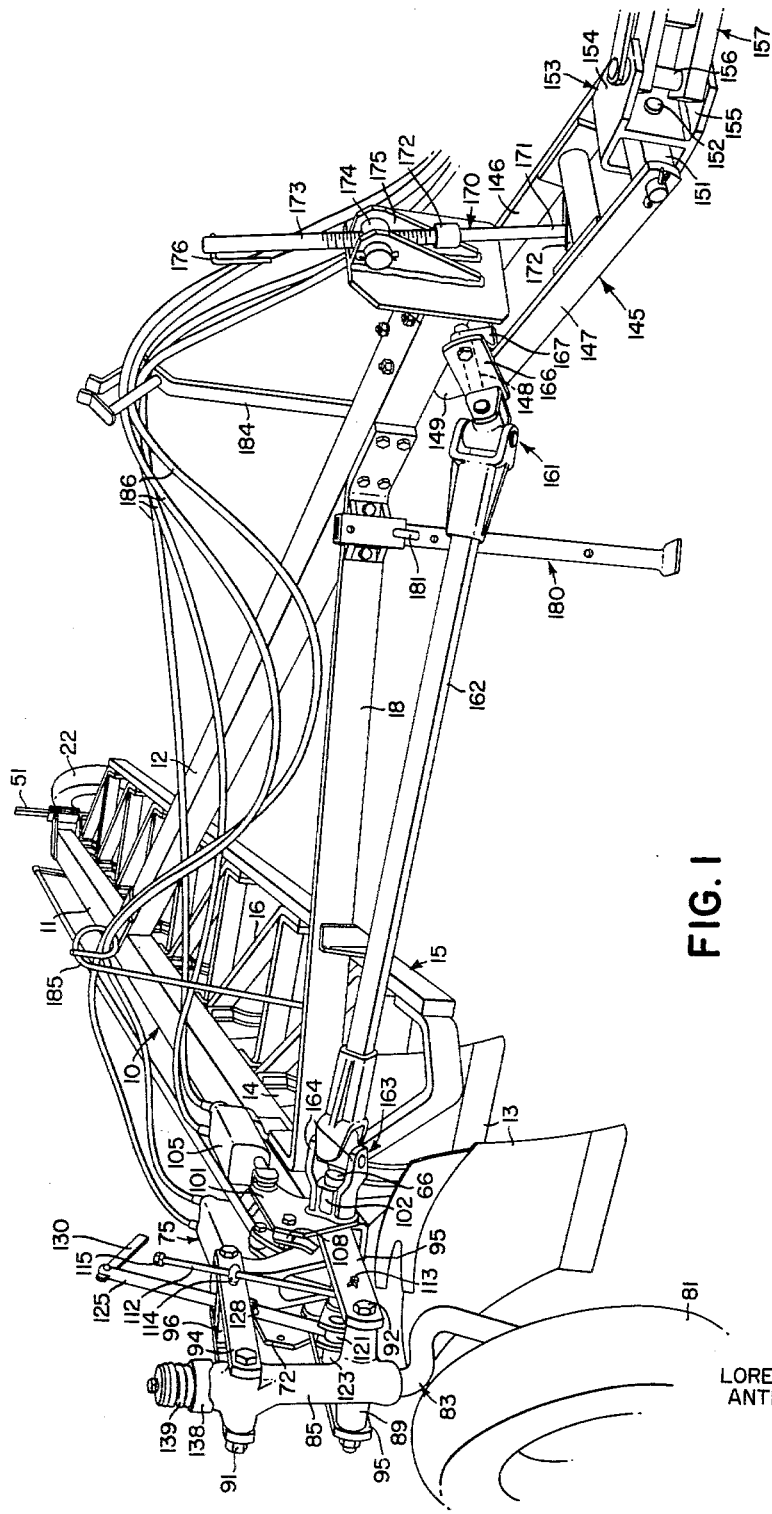
FIG. 1 is a perspective view, taken from the front end of the plow, showing the latter in an operating or plowing position.

Referring first to FIG. 1, the frame of the plow is indicated by the reference numeral 10 and includes a main frame member 11 and a hitch frame member 12, the latter being rigidly connected at its rear end to the generally intermediate portion of the main frame member 11, as by any suitable means. A plurality of plow bottoms 13 are connected to the main frame bar 11 by standards or attaching brackets 14 that generally are of conventional construction being bolted or otherwise securely fastened to the frame bar 11. Auxiliary frame structure 15 is carried by the frame bar 11 and serves not only to reinforce the latter but also to form means receiving coulter attaching brackets 16. A cross bar 18 is fixedly secured at its end to the frame bar 11 and to the hitch bar 12 whereby the latter is firmly and rigidly connected to the frame 10 so as to form a part thereof the forward end of the hitch bar 12 extending generally forwardly of the forward end of the frame bar 11.

The rear end of the frame 10 is supported on a rear furrow wheel 21 and a rear land wheel 22 (FIG. 4), the rear furrow wheel 21 being mounted for rotation on the lower downwardly and outwardly extending axle portion 23 of a rear furrow wheel spindle 24 that is disposed within a vertical sleeve section 25 formed preferably as a casting that includes an upper laterally extending sleeve section 26 and a lower sleeve section 27. The laterally extending sleeve sections 26 and 27 swingably receive the laterally turned ends of upper and lower links 28 and 29. The laterally turned ends of the upper link member 28 are interconnected by a strap member in the form of a lever 31, and suitable means is provided for adjustably securing the rear furrow wheel spindle 24 in different positions about a generally vertical axis so as to impart to the rear furrow 21 the desired amount of lead. The forward laterally turned ends of the links 28 and 29 are rockably received in sleeve sections 35 and 36 of an attaching casting 37 that is secured to the rear plow connecting bracket 38, the latter being secured to the main frame bar 11 by virtue of attachment to generally fore-and-aft extending attaching angles 39.

Power means is provided for raising and lowering the rear end of the frame 10 relative to the rear furrow wheel 21. This means takes the form of a bell crank 40 swingably mounted on the rear end of the main frame bar 11 by shaft means 41 disposed in a sleeve section 42 carried by the bar 11. The rear and lower portion of the bell crank 40 is connected by means of links 43 to the forwardmost end of the lever 31 whereby, when the bell crank 40 is turned in a clockwise direction as viewed in FIG. 4, the links 28 and 29 are swung downwardly, reacting against the rear furrow wheel 21 to raise the rear end of the frame 10 relative thereto. A cap 45 fastened to the upper end of the spindle 24 holds the latter in position in the vertical sleeve 25.

The rear land wheel 22 is mounted on an axle fixed to the lower end of a vertical standard 51 that is provided with a plurality of openings 52 and is slidable generally vertically within spaced apart portions 53 of a bracket 54 that is fixed to the frame bar 11. The standard 51 is held in different positions by means of a pin 55 insertable through selected openings 52 and into or through slots 56 formed in the spaced portions 53. The vertical position of the land wheel 22 serves as means controlling or limiting the depth of plowing, whereby it serves as a gauge wheel.

Figure 3:
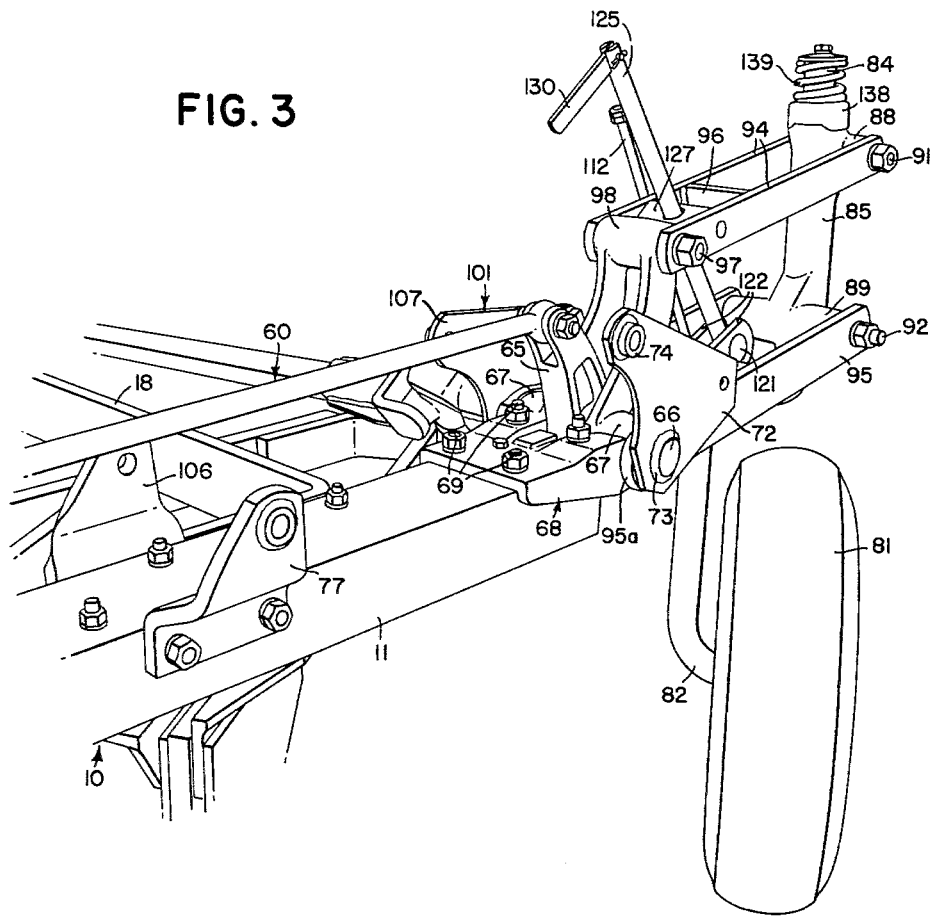
FIG. 3 is an enlarged perspective view of the front furrow wheel raising and lowering means and associated parts taken from the right side of the plow.
Figure 4:
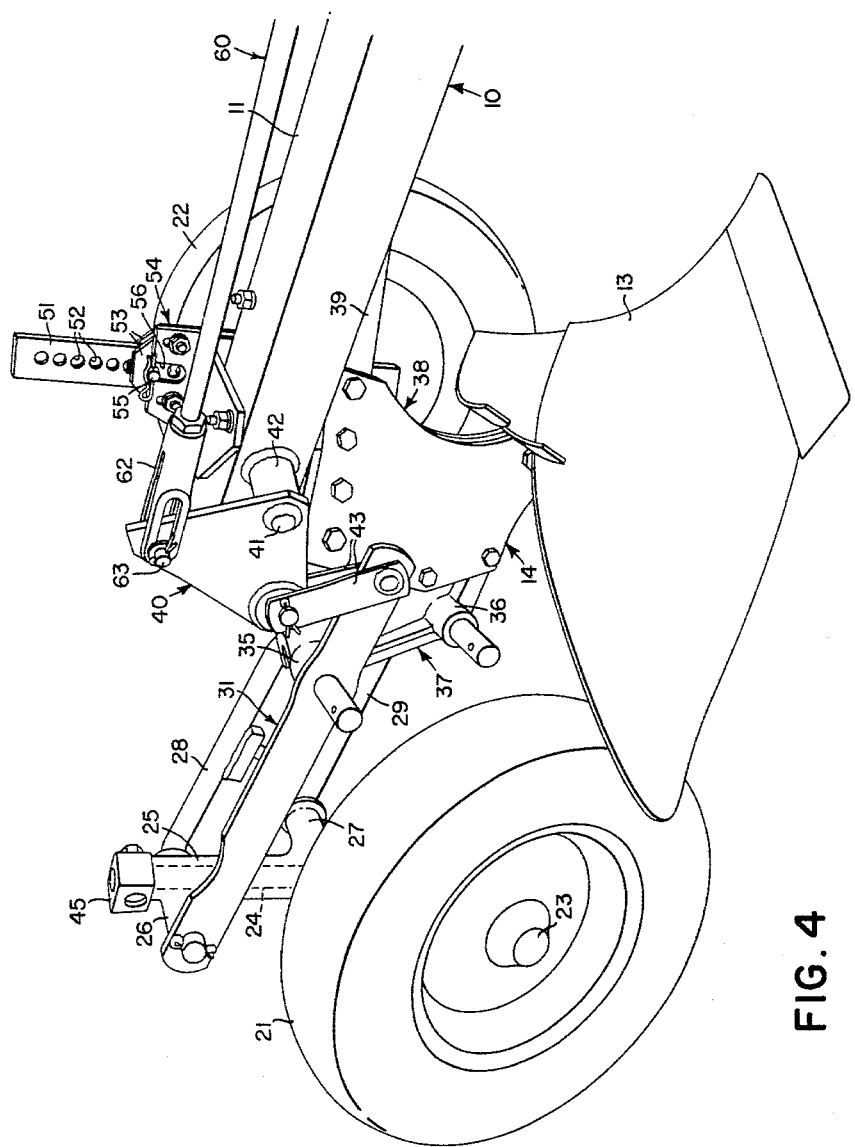
FIG. 4 is an enlarged perspective view of the rear end of the plow, showing the details of the rear end raising and lowering means, taken from the right side of the plow.

The bell crank 40 is operated by means of a generally fore-and-aft extending rod 60 having its rear end adjustably connected to a slotted yoke 62, the slots of which receive a cross pin 63 carried by the upper portion of the bell crank 40, as best shown in FIG. 4. The forward end of the rod 60, as best shown in FIG. 3, is pivotally connected to an arm 65 that is fixed to a rockshaft 66 that is journalled in a pair of sleeve sections 67 formed on a front bracket 68 that is bolted, as at 69, to the front end of the frame bar 11. A plate 72 is welded, as at 73, to the right end of the shaft 66. The upper portion of the plate 72 is provided with a bushing 74 to receive the piston end of a power cylinder 75 (FIG. 1), and the rear end of the latter is connected by a bracket 77 to the main frame bar 11. Whenever the cylinder 75 is extended, as by directing a flow of fluid under pressure into the cylinder 75 from a source usually carried by or forming a part of the propelling tractor, the upper portion of the pivoted plate 72 and the upper end of the arm 65 are swung forwardly, thus exerting a pull through the rod 60 and acting through the links 43 to raise the forward end of the lever 31, thus forcing the rear furrow wheel 21 downwardly and thereby raising the rear end of the frame 10 upwardly to raise the rear plow bottoms into a transport position. The front end of the frame member 11 is supported on a front furrow wheel 81 that is journalled on the lower out-turned end 82 (FIG. 3) of a generally vertical wheel spindle 83, the upper portion 84 of which is mounted for swinging movement about a vertical axis within a vertical sleeve 85 that is connected by parallel link means with the front portion of the frame bar 11. The member 85 is in the form of a casting and has upper and lower laterally extending sleeves 88 and 89 in which suitable pin means 91 and 92 are disposed. Interconnected pairs of upper and lower links 94 and 95 are swingable on the pins 91 and 92 and at their rear ends are swingable relative to the main frame bar 11. Preferably, the upper links 94 are rigidly interconnected by a welded cross strut 96, the rear ends of the links 94 being apertured to receive an upper pin 97 that is journalled by suitable bushing means in the upper sleeve portions 98 of the frame bracket 68. The rear ends of the lower links 95 are swingable relative to cross shaft 66, the rear ends 95a of the links 95 being disposed between the sleeve section 67 and the associated plates 72 and 101. The latter has welded to it a sleeve section 102 (FIG. 1) whereby the plate 101 is rockably mounted on the left end of the cross shaft 66, the plate 101 being freely rockable on the shaft 66. A second power cylinder 105 (FIG. 1) has one end connected to a bracket 106 (FIG. 3) fixed to the forward end of the main frame bar 11, the piston end of the unit 105 being pivotally connected to the upper portion 107 of the plate 101. The forwardmost portion of the latter plate carries a stop 108 that is adapted to engage the edge of the adjacent link 95 so that cylinder 105 is extended, the plate 101 acts against the left-hand link 95 to swing the links 94 and 95 downwardly so as to raise the front end of the main frame bar 11 relative to the front furrow wheel 81. If desired, this movement may be limited by a stop rod 112 pivoted at its lower end, as at 113, to the left link 95 and extending at its upper end through an eye 114 carried by the associated upper link 94. A pair of stop nuts 115 act through the eye 114 to limit the downward movement of the swingable links 94 and 95.

For limiting movement of the front parallel links 94 and 95 in the other direction, a trunnion 121 (FIG. 3) is swingably mounted in a pair of lugs 122 fixed to a spacing sleeve 123 (FIG. 1) that at its ends is welded to the lower links 95, and a screw threaded rod 125 is threaded into the trunnion 121 and extends upwardly and passes through a block 127 that is pivoted at its ends to the upper links 94. An abutment 128 on the rod 125 is adapted to engage the block 127 when the plow frame is lowered relative to the front furrow wheel 81, engagement of the abutment 128 with the block 127 serving to establish a depth of operation, which can be adjusted by turning the rod 125 in one direction or the other, as by a pivoted handle 130. In this way, it is not necessary to rely on the cylinder 105 for establishing or maintaining the desired depth of operation.

A snubbing block 138 and cooperating spring 139 are carried at the upper end of the spindle 84 and cooperate with the upper end of the sleeve 85 to yieldingly hold the wheel 81 in a generally central position so that the wheel 81 rolls freely in the forward or operating position.

Figure 2:
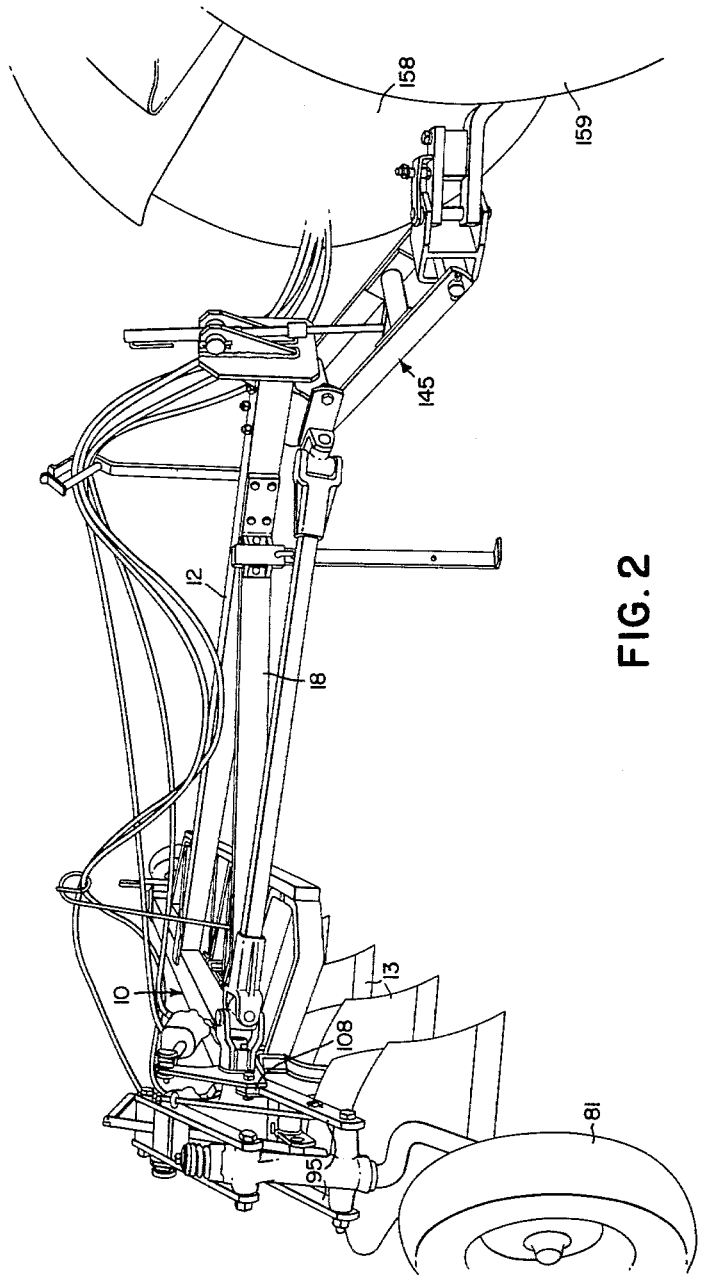
FIG. 2 is a front end view, similar to FIG. 1, showing the plow in its raised or transport position.

A front hitch member 145 (FIGS. 1 and 2) is pivotally connected to the forward end of the hitch bar 12. The hitch member 145 is made up of a pair of forwardly extending arms 146 and 147 that are pivotally connected by a transverse shaft 148 to a generally U-shaped bracket 149 fixed to the lower side of the forward end of the hitch bar 12, whereby the member 145 may swing upwardly or downwardly relative to the frame 10. The arms 146 and 147 are pivoted on the cross shaft 148. A cross member 151 is swivelly connected to the front ends of the arms 146 and 147 and is connected for rocking movement about a fore-and-aft extending axis, as established by a longitudinally extending pin 152 that is carried by a coupling member 153 having upper and lower sections 154 and 155 carrying a hitch pin 156 by which the member 153 is connected to the tractor drawbar 157 for generally horizontal swinging about a vertical axis, the tractor having spaced apart rear wheels 158, 159. By virtue of this construction, the plow may tilt relative to the tractor about a generally fore-and-aft extending axis and may swing laterally relative to the tractor about a generally vertical axis. The short cross shaft 148 is extended and connected to one portion of a universal joint 161, the other portion of which is connected to a cross connection in the form of a shaft 162 that is preferably square in cross section. The right end of the shaft 162 is connected by universal joint means 163 to the rockable plate 101, the sleeve 102 of which receives arms 164 that form a part of the universal joint 163. By virtue of this construction, whenever the plate 101 is rocked by the cylinder 105 to raise and lower the front furrow wheel 81, the pivoted hitch member 145 is rocked in a corresponding direction. This is accomplished by means of arms 166, one at each end of the cross shaft 148, secured thereto as by welding, the outer ends of the arms 166 carrying abutments 167 that engage the upper edges of the arms 146 and 147 so that when the front furrow wheel 81 is forced downwardly to raise the front portion of the plow frame 10, the hitch member 145 is also forced downwardly so as to raise the front end of the hitch bar 12 relative to the tractor drawbar 157.

Adjustable means 170 is provided for determining the amount of upward swinging movement of the hitch member 145 relative to the hitch bar 12 that is permitted when the front furrow wheel 81 is raised relative to the plow frame. The means 170 includes a lower rod in the nature of an eye bolt 171 pivoted at its lower end to a bracket 172 carried by the forward portion of the hitch member 145. The upper end of the member 171 is threaded into a sleeve 172 carried by a tubular member 173 that is extended through an opening in a trunnion 174 carried by a bracket 175 fixed to the front end of the hitch bar 12. The upper end of the tubular member 173 carries an operating crank 176. The sleeve 172 is welded to the lower end of the tubular member 173 and, being of larger diameter than the member 173, serves as an abutment adapted to engage the trunnion member 174 in the plowing position. The interior of the sleeve 172 is threaded and is screwed onto the upper threaded end 171a of the member 171, whereby turning the member 173 by the crank 176 in one direction or the other serves to adjust the position of the member 172 on the member 171. The contact of the sleeve 172 with the trunnion 174 serves to limit the upward swinging of the hitch 145, thus determining the operating position of the front end of the hitch bar 12.

A parking stand 180 is carried by the plow frame adjacent the forward end of the hitch bar 12 and is adjustably secured in position by means of a pin 181. The plow frame 10 carries suitable supports 184 and 185 for hose lines 186 that extend to the cylinders 75 and 105 that raise and lower the front and rear portions of the plow frame.

While we have shown and described above the preferred structure in which the principles of this invention have been incorporated, it is to be understood that widely different means may be employed in the practice of the broader aspects of our invention.

What we claim and desire to secure by Letters Patent is:

1. In an agricultural implement, a main frame bar extending obliquely to the direction in which the implement is adapted to be pulled, a plurality of depending earth-working tools mounted on said main frame bar, a forwardly extending hitch bar nonrotatably attached to the main frame bar, generally vertically shiftable hitch means carried by said hitch bar adapted to be secured to a tractor, and forward and rear furrow wheels mounted on forward and rear portions of the main frame bar, respectively, each of said furrow wheels being mounted for generally vertical movement, a rockshaft journaled on the main frame bar, a rock arm secured to a central portion of said rockshaft, a first member nonrotatably secured to one end of said rockshaft, a second member journaled about the other end of said rockshaft, a pair of separately operable power cylinders mounted on the forward portion of said main frame bar, means connecting said rear furrow wheel with said rock arm, means connecting one cylinder to said first member to shift said rear furrow wheel, means connecting the other cylinder to said second member, means connecting the second member to the front furrow wheel to shift the wheel downwardly, cross shaft means, first means interconnecting one end of said cross shaft means with said second member to rotate said cross shaft means in one direction when said front furrow wheel is lowered, and second means interconnecting the other end of said cross shaft means with the vertically swingable hitch means to swing the forward end of the swingable hitch means downwardly when said cross shaft means is rotated in said one direction.

2. In an agricultural implement, a main frame bar extending obliquely to the direction in which the implement is adapted to be pulled, a plurality of depending earth-working tools mounted on said main frame bar, a forwardly extending hitch bar non-rotatably attached to the main frame bar, means carried by said hitch bar adapted to be connected with the drawbar of a tractor for both pivotal and rotational movement, said last named means being swingably connected with the forward end of said hitch bar for generally vertical movement, forward and rear furrow wheels mounted on forward and rear portions of the main frame bar, a rockable member mounted on the front portion of said main frame bar and connected with the front furrow wheel to raise and lower the latter relative to said main frame bar, a generally transverse cross shaft disposed between the forward end of the hitch bar and the front portion of the main frame bar, first universal joint means interconnecting one end of said cross shaft with the rockable member on the front portion of the main frame bar to rotate said cross shaft in one direction when said rockable member is rotated to lower the front furrow wheel, and second means including a universal joint interconnecting the other end of said cross shaft with the vertically swingable hitch means on the forward end of the hitch bar to swing the forward end of the swingable hitch means downwardly when said cross shaft is rotated in said one direction.

3. In a plow, a generally diagonally extending main frame bar, front and rear furrow wheels, generally vertically shiftable means connecting the rear furrow wheel with the rear end portion of said main frame bar, generally vertically shiftable means including upper and lower link means connecting the front furrow wheel with the front end of said main frame bar, a transverse rockshaft journaled in the front end portion of said main frame bar, said lower link means being rockable on said rockshaft, a plate member also rockable on said rockshaft adjacent said lower link means, a power cylinder carried by said main frame bar anad connected with said plate member to shift the latter about the axis of said rockshaft, a stop on said plate member engageable with said lower link means, whereby when said power cylinder operates to swing said plate member said lower link means is moved to shift said front furrow wheel relative to said main frame bar, universal joint means connected to said plate member about the axis of said rockshaft, a hitch bar rigidly connected with said frame bar, a pivoted hitch member pivotally connected to the forward end of said hitch bar, a cross shaft connected at one end to said universal joint means and means including a universal joint connecting the other end of said cross shaft with said pivoted hitch member.

References Cited by the Examiner
UNITED STATES PATENTS

| | | | |
|---|---|---|---|
| 2,344,123 | 3/1944 | Brown et al. | 172—327 X |
| 2,767,538 | 10/1956 | Scheidenhelm | 172—328 X |
| 2,780,158 | 2/1957 | Pursche | 172—328 X |
| 2,824,505 | 5/1958 | Couiello | 172—328 X |
| 2,828,680 | 4/1958 | Johnson | 172—310 |
| 2,865,461 | 12/1958 | Heth et al. | 172—328 X |
| 2,939,539 | 6/1960 | Kramer | 172—413 X |
| 2,979,140 | 5/1961 | McKenzie | 172—413 X |
| 2,985,246 | 5/1961 | Shipp | 172—417 X |
| 3,082,830 | 3/1963 | McKay | 172—328 |

ABRAHAM G. STONE, *Primary Examiner.*

T. GRAHAM CRAVER, *Examiner.*